(12) United States Patent
Haas et al.

(10) Patent No.: US 12,460,593 B2
(45) Date of Patent: Nov. 4, 2025

(54) SYSTEMS AND METHODS FOR CONTROLLING AN ENGINE BASED ON AFTERTREATMENT SYSTEM CHARACTERISTICS

(71) Applicant: Cummins Inc., Columbus, IN (US)

(72) Inventors: Michael Haas, Columbus, IN (US); Adam W. Kidd, Indianapolis, IN (US); Jeffrey David Selwyn Diwakar Abraham, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/013,006

(22) Filed: Sep. 4, 2020

(65) Prior Publication Data

US 2020/0400088 A1 Dec. 24, 2020

Related U.S. Application Data

(63) Continuation of application No. 15/456,810, filed on Mar. 13, 2017, now Pat. No. 10,767,584.

(51) Int. Cl.
*F01N 9/00* (2006.01)
*F01N 3/021* (2006.01)
(Continued)

(52) U.S. Cl.
CPC ......... *F02D 41/0235* (2013.01); *F01N 3/021* (2013.01); *F01N 3/101* (2013.01);
(Continued)

(58) Field of Classification Search
CPC .. F01N 11/00; F01N 2430/00; F01N 2550/02; F01N 2570/14; F01N 2610/02;
(Continued)

(56) References Cited

U.S. PATENT DOCUMENTS 8,209,963 B2 7/2012 Kesse et al.
8,505,278 B2 8/2013 Farrell et al.
(Continued)

FOREIGN PATENT DOCUMENTS

EP 2 913 506 A1 9/2015
WO WO-2016/068867 A1 5/2016

*Primary Examiner* — Phutthiwat Wongwian
*Assistant Examiner* — Diem T Tran
(74) *Attorney, Agent, or Firm* — Foley & Lardner LLP

(57) ABSTRACT

Systems and apparatuses include an a system including an engine out sensor, an exhaust sensor, and one or more processing circuits comprising one or more memory devices coupled to one or more processors. The one or more memory devices are configured to store instructions thereon that, when executed by the one or more processors, cause the one or more processors to receive the engine out sensor information from the engine out sensor, receive the exhaust information from the exhaust sensor, determine the aftertreatment system characteristic based on the exhaust information, compare the aftertreatment system characteristic to an exhaust condition, determine an acceptable input value when the aftertreatment system characteristic meets the exhaust condition, and control at least one of a fuel system actuator and an air handling actuator to achieve the acceptable input value.

8 Claims, 5 Drawing Sheets

(51) Int. Cl.
*F01N 3/10* (2006.01)
*F01N 3/20* (2006.01)
*F01N 11/00* (2006.01)
*F02D 41/00* (2006.01)
*F02D 41/02* (2006.01)
*F02D 41/30* (2006.01)
*F02D 41/14* (2006.01)

(52) U.S. Cl.
CPC ........... *F01N 3/103* (2013.01); *F01N 3/2066* (2013.01); *F01N 3/208* (2013.01); *F01N 9/00* (2013.01); *F01N 11/00* (2013.01); *F02D 41/0002* (2013.01); *F02D 41/0245* (2013.01); *F02D 41/0275* (2013.01); *F02D 41/3005* (2013.01); *F01N 2430/00* (2013.01); *F01N 2550/02* (2013.01); *F01N 2570/14* (2013.01); *F01N 2610/02* (2013.01); *F01N 2900/1402* (2013.01); *F01N 2900/1404* (2013.01); *F01N 2900/1411* (2013.01); *F01N 2900/1616* (2013.01); *F01N 2900/1621* (2013.01); *F02D 41/1445* (2013.01); *F02D 41/1446* (2013.01); *F02D 41/146* (2013.01); *F02D 2041/1468* (2013.01); *Y02T 10/12* (2013.01); *Y02T 10/40* (2013.01)

(58) Field of Classification Search
CPC ..... F01N 2900/1402; F01N 2900/1404; F01N 2900/1411; F01N 2900/1616; F01N 2900/1621; F01N 3/021; F01N 3/101; F01N 3/103; F01N 3/2066; F01N 3/208; F01N 9/00; F02D 2041/1468; F02D 41/0002; F02D 41/0235; F02D 41/0245; F02D 41/0275; F02D 41/1445; F02D 41/1446; F02D 41/146; F02D 41/3005; Y02T 10/12; Y02T 10/40
See application file for complete search history.

(56) References Cited

U.S. PATENT DOCUMENTS

| | | | |
|---|---|---|---|
| 8,826,644 B2 | 9/2014 | Ponnathpur | |
| 8,899,024 B2 | 12/2014 | Masaki et al. | |
| 9,181,835 B2 | 11/2015 | Aliyev | |
| 2007/0227125 A1 | 10/2007 | Robertson et al. | |
| 2010/0028230 A1* | 2/2010 | Gady | F01N 3/208 423/239.1 |
| 2010/0043404 A1* | 2/2010 | Hebbale | F01N 9/00 60/286 |
| 2010/0242440 A1* | 9/2010 | Garimella | B01D 53/9409 60/276 |
| 2011/0023462 A1* | 2/2011 | Kurtz | F01N 3/208 60/297 |
| 2011/0072798 A1 | 3/2011 | Herman | |
| 2011/0262329 A1* | 10/2011 | Ofoli | B01D 53/9477 423/213.2 |
| 2013/0067894 A1 | 3/2013 | Stewart et al. | |
| 2013/0111905 A1 | 5/2013 | Pekar et al. | |
| 2013/0276428 A1* | 10/2013 | Levijoki | F01N 3/208 60/274 |
| 2013/0291517 A1* | 11/2013 | Kowalkowski | F01N 11/00 60/276 |
| 2014/0260201 A1 | 9/2014 | Hall | |
| 2015/0047318 A1 | 2/2015 | Aliyev | |
| 2015/0168260 A1 | 6/2015 | Adams et al. | |
| 2015/0209730 A1* | 7/2015 | Blanckenfiell | B01D 53/9495 422/111 |
| 2015/0219032 A1 | 8/2015 | Yamamoto et al. | |
| 2016/0045869 A1* | 2/2016 | Schmitt | F01N 3/208 700/274 |
| 2016/0131003 A1* | 5/2016 | Kogo | F01N 3/208 60/276 |
| 2017/0030243 A1* | 2/2017 | Li | F01N 9/007 |
| 2018/0023440 A1* | 1/2018 | Cho | F01N 3/0842 60/274 |

* cited by examiner

SYSTEMS AND METHODS FOR CONTROLLING AN ENGINE BASED ON AFTERTREATMENT SYSTEM CHARACTERISTICS

CROSS REFERENCE TO RELATED APPLICATIONS

This application is a continuation of U.S. patent application Ser. No. 15/456,810 filed on Mar. 13, 2017, the entire contents of which are incorporated herein by reference.

TECHNICAL FIELD

The present disclosure relates to aftertreatment systems. More particularly, the present disclosure relates to systems and methods for controlling engine operating parameters response to one or more exhaust aftertreatment system characteristics.

BACKGROUND

Exhaust aftertreatment systems are designed to reduce emissions of harmful exhaust gases produced by an engine. Exhaust aftertreatment systems may include a selective catalyst reduction (SCR) system, an exhaust gas recirculation (EGR) system, and/or various other system components intended to reduce emissions (e.g., reduce particulate matter, NOx, etc.) to less environmentally harmful emissions.

SUMMARY

One embodiment relates to an apparatus that includes an aftertreatment system control circuit structured to receive a signal indicative of an exhaust gas characteristic from a sensor, determine an aftertreatment system characteristic based on the exhaust gas characteristic, determine an acceptable input value responsive to the aftertreatment system characteristic, and control at least one of a fuel system actuator and an air handling actuator to achieve or substantially achieve the acceptable input value.

Another embodiment relates to a system that includes a sensor structured to provide a sensor signal indicative of an exhaust gas characteristic, an aftertreatment system control circuit, and an engine control circuit. The aftertreatment system control circuit is structured to receive the sensor signal, determine an aftertreatment system characteristic as a function of the exhaust gas characteristic, determine an acceptable input value as a function of the aftertreatment system characteristic, and send a command signal indicative of the acceptable input value. The engine control circuit is structured to receive the command signal, and to control at least one of a fuel system and an air handling actuator to achieve or substantially achieve the acceptable input value.

Another embodiment relates to a method that includes receiving a signal indicative of an exhaust gas characteristic from an aftertreatment sensor by an aftertreatment system control circuit. An aftertreatment system characteristic is determined by the aftertreatment system control circuit as a function of the exhaust gas characteristic. An acceptable input value is determined by the aftertreatment system control circuit as a function of the aftertreatment system characteristic, and the acceptable input value is communicated to an engine control circuit. Then at least one of a fuel system and an air handling actuator is controlled by the engine control circuit to achieve the acceptable input value.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for model based catalyst diagnostics. The various concepts introduced above and discussed in greater detail below may be implemented in any number of ways, as the concepts described are not limited to any particular manner of implementation. Examples of specific implementations and applications are provided primarily for illustrative purposes.

Referring the Figures generally, the various embodiments disclosed herein relate to systems, apparatuses, and methods for an aftertreatment system controller to communicate one or more aftertreatment system input values or conditions to an engine controller to control an engine based on these one or more aftertreatment system input conditions in order to achieve a desired operating characteristic of the aftertreatment system. The aftertreatment system controller receives information from various aftertreatment sensors (e.g., virtual sensors or real sensors) and determines in real, or substantially real time the capacity or capabilities of the aftertreatment system. For example, the capabilities may include a NOx emissions amount being above or below a predefined threshold value, an indication of an ammonia slip amount being above a threshold value, etc. Based on these determined capabilities, the aftertreatment system controller can control or facilitate control of one or more engine operating conditions in order to impact/affect various characteristics of the exhaust aftertreatment system to meet or substantially meet one or more predefined desired characteristics of the aftertreatment system (such as, ensuring or substantially ensuring NOx emissions are below the threshold value, etc.). This control scheme provides an improved usage efficiency of the overall aftertreatment system and provides benefits including, but not limited to, fewer onboard diagnostic (OBD) faults, fewer OBD false faults (e.g., identifying a healthy or properly functioning system or component as faulty), a dynamic relationship between engine operating conditions and aftertreatment system operating conditions, improved fuel efficiency, the possibility of reduced catalyst size and system size, improved emissions reduction over the life of the aftertreatment system, and the potential to reduce the size/influence of or eliminate entirely an ammonia oxidation catalyst (AMOX) system from the aftertreatment system.

Figure 1:
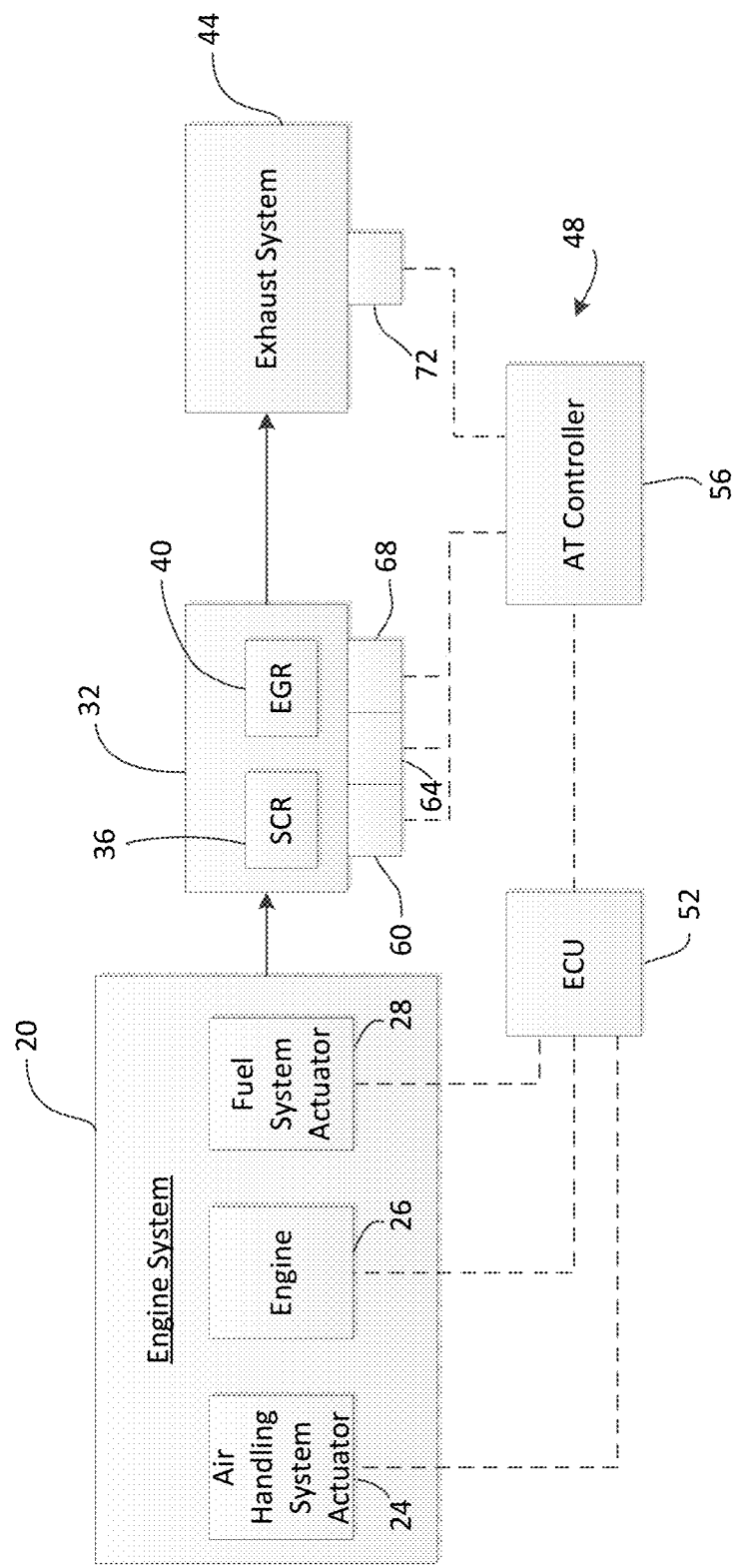
FIG. 1 is a schematic diagram of an engine and an aftertreatment system, according to an example embodiment.

As shown in FIG. 1, an engine system 20 includes an air handling system actuator 24, an engine 26 including a combustion chamber, and a fuel system actuator 28. In one configuration, the engine system 20 can be an internal combustion engine such as a spark-ignition engine fueled by gasoline, natural gas, ethanol, propane, or another fuel suitable for spark-ignition. In the example shown, the engine system 20 is a compression-ignition engine fueled by diesel, or another fuel suitable for compression-ignition. The engine 26 can include a combustion chamber and an exhaust port or manifold that couples to the engine exhaust pipe to contain the engine exhaust gases. Many designs and arrangements of engines may be used with the embodiments described herein and the engine system 20 shown and described are to be construed as a non-limiting example.

The engine system 20 may be implemented in a variety of applications. For example, in one embodiment, the engine system 20 is implemented in a vehicle. The vehicle may include, but is not limited to, an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, and any other type of vehicle. In another configuration, the engine system 20 is implemented in another type of engine-driven equipment such as mining equipment, a power generator, and marine equipment.

In the example shown, the air handling system actuator 24 is positioned in an air flow path upstream of the combustion chamber and affects the flow of air through the engine system 20. In other embodiments, the air handling system actuator 24 is positioned in an airflow path downstream of the combustion chamber and affects the flow of air though the engine system 20. In some embodiments, the air handling system actuator 24 is a valve within a turbocharger unit. In some embodiments, the air handling system actuator 24 is a valve within a supercharger unit or another compressor that provides pressurized air to the combustion chamber. In some embodiments, the air handling system actuator 24 is a motor, a controller, a valve, a vent, a variable geometry turbo charger (VGT) actuator, an automatic voltage regulator (AVR) valve, an engine throttle, an exhaust throttle an exhaust gas recirculation (EGR) valve, or an engine brake. In some embodiments the air handling system actuator 24 is a controller or control circuit that affects operation of an air handling system or component thereof. Thus, the air handling system actuator 24 can be any component of the engine system 20 that affects the flow of air into or out of the combustion chamber to affect the operating characteristics of the engine system 20.

The fuel system actuator 28 is positioned in a fuel flow path upstream of the combustion chamber and affects the flow of fuel to the combustion chamber. Accordingly, the fuel system actuator 28 may include, but is not limited to, a fuel injector, a rail valve, a fuel pump, a metering valve, a controller or control circuit, another component of a fuel system that affects the flow of fuel to the combustion chamber, and/or a combination thereof.

An aftertreatment system 32 is coupled to the engine 20 to receive exhaust gases from the engine system 20 and treat the exhaust gases to reduce emissions of harmful exhaust gas constituents (e.g., reduce CO emissions, reduce NOx emissions, reduce particulate matter emissions, reduce unburnt hydrocarbon emissions, etc.). As shown, the aftertreatment system 32 includes a selective catalyst reduction (SCR) system 36 and an exhaust gas recirculation (EGR) system 40. However, in other embodiments, the aftertreatment system 32 includes a three-way catalyst, a two-way catalyst, a diesel particulate filter (DPF), a diesel oxidative catalyst (DOC), an AMOx catalyst, and/or any other aftertreatment system component as desired. Thus, the particular components of the aftertreatment system 32 are discussed as non-limiting examples s the systems, apparatuses, and methods described herein may be practiced with other aftertreatment components. In this regard, those of ordinary skill in the art will readily recognize and appreciate the high configurability of the aftertreatment system 32 (e.g., as to the type of components includes, the relative locations of those components, etc.) with all such variations intended to fall within the spirit and scope of the present disclosure.

An exhaust system 44 is fluidly coupled to the aftertreatment system 32 to receive the treated exhaust gas from the aftertreatment system 32. The exhaust system 44 can include a muffler, a particulate filter, or other components as desired.

A control system 48 is coupled to at least one engine system 20 (or a component therein), the aftertreatment system 32, and the exhaust system 44. The control system 48 controls operation of the engine system 20 and the aftertreatment system 32. The control system 48 includes an engine control unit (ECU) 52, an aftertreatment system controller 56, an engine out temperature sensor 60, an engine out nitrogen oxides (NOx) sensor 64, an ammonia (NH3) slip sensor 68, and an aftertreatment system out temperature sensor 72. The ECU 52 is in communication with the aftertreatment system controller 56 and controls operation of the air handling system actuator 24 and the fuel system actuator 28. The ECU 52 may also be in communication with various sensors and other systems/components of the engine system 20 to affect and control operating conditions and parameters of the engine system 20.

The engine out temperature sensor 60 is positioned to sense/acquire data indicative of a temperature of exhaust gas leaving the engine system 20 before the exhaust gas enters the aftertreatment system 32. In this regard, the engine out temperature sensor 60 provides an engine out temperature signal to the aftertreatment system controller 56 that is indicative of the temperature of the exhaust gas leaving the engine system 20.

The engine out NOx sensor 64 is positioned to sense/acquire data indicative of a NOx level or amount in the exhaust gas leaving the engine system 20 before the exhaust gas enters the aftertreatment system 32. The engine out NOx sensor 64 provides an engine out NOx signal to the aftertreatment system controller 56 that is indicative of the NOx level of the exhaust gas leaving the engine system 20.

The NH3 slip sensor 68 is positioned to sense/acquire data indicative of a NH3 level leaving the aftertreatment system 32. The NH3 slip sensor 68 provides an ammonia slip signal to the aftertreatment system controller 56 that is indicative of the NH3 level of the exhaust gas leaving the aftertreatment system 32. In other configurations, the NH3 slip sensor may be omitted from the aftertreatment system. In this configuration, NH3 slip could be detected via an NH3 sensor, some other sensor that is cross sensitive to NH3, or via some sort of signal processing or embedded catalyst model.

The aftertreatment system out temperature sensor 72 is positioned to sense/acquire data indicative of a temperature of exhaust gas leaving the aftertreatment system 32. The aftertreatment system out temperature sensor 72 provides an aftertreatment system out temperature signal to the aftertreatment system controller 56 that is indicative of the temperature of the exhaust gas leaving the aftertreatment system 32.

The sensors discussed above are only exemplary. The position, type, and number of sensors may be changed in other embodiments. For example, the ammonia slip may be detected by a virtual sensor (e.g., a calculation based on NH3 dosing rates and NOx sensor readings). As another example, a pressure sensor or fluid flow sensor may be implemented downstream of the engine 26.

Figure 2:
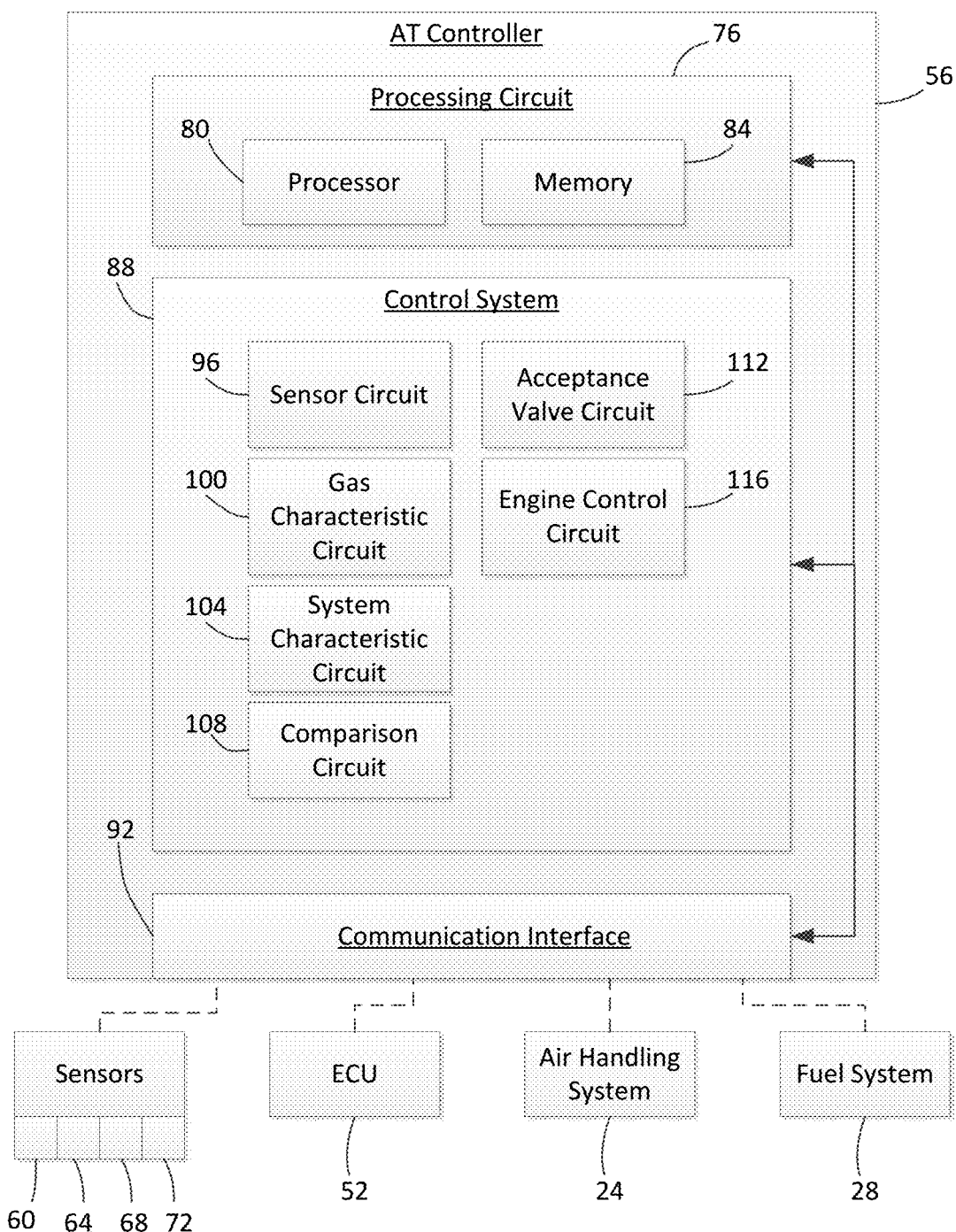
FIG. 2 is a schematic diagram of an aftertreatment system controller used with the aftertreatment system of FIG. 1, according to an example embodiment.

As shown in FIG. 2, a schematic diagram of the aftertreatment system controller 56 is depicted according to an example embodiment. The controller 56 includes a processing circuit 76 having a processor 80 and a memory device 84, a control system 88, and a communications interface 92. The control system 88 includes a sensor circuit 96, a gas characteristic circuit 100, a system characteristic circuit 104, a comparison circuit 108, an acceptable value circuit 112, and an engine control circuit 116. The aftertreatment system controller 56 is structured to communicate with the engine out temperature sensor 60, the engine out NOx sensor 64, the NH3 slip sensor 68, and the aftertreatment system out temperature sensor 72 and to provide catalyst input values to the ECU 52 so that the engine system 20 is operated to meet or substantially meet a desired operating characteristic of the aftertreatment system.

In one configuration, the control system 88 is embodied as machine or computer-readable media that is executable by a processor, such as processor 80. Amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In some embodiments, multiple remote processors may be connected to each other through any type of network (e.g., CAN bus, etc.).

In another configuration, the control system 88 is embodied as hardware units, such as electronic control units. As such, the control system 88 may be embodied as one or more circuitry components including, but not limited to, processing circuitry, network interfaces, peripheral devices, input devices, output devices, sensors, etc. In some embodiments, the control system 88 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 88 may include any type of component for accomplishing or facilitating achievement of the operations described herein. For example, a circuit may include one or more transistors, logic gates (e.g., NAND, AND, NOR, OR, XOR, NOT, XNOR, etc.), resistors, multiplexers, registers, capacitors, inductors, diodes, wiring, and so on). The control system 88 may also include programmable hardware devices such as field programmable gate arrays, programmable array logic, programmable logic devices or the like. The control system 88 may include one or more memory devices for storing instructions that are executable by the processor(s) of the control system 88 or the processor 80. The one or more memory devices and processor(s) may have the same definition as provided below with respect to the memory device 84 and processor 80. In this hardware unit configuration, the control system 88 may be geographically dispersed throughout separate locations in the engine system 20, the aftertreatment system 32, or another component of an overall system such as a vehicle. Alternatively, and as shown, the control system 88 may be embodied in or within a single unit/housing, which is shown as the aftertreatment system controller 56.

In the example shown, the aftertreatment system controller 56 includes the processing circuit 76 having the processor 80 and the memory 84. The processing circuit 76 may be structured or configured to execute or implement the instructions, commands, and/or control processes described herein with respect to the control system 88. The depicted configuration represents the aforementioned arrangement where the control system 88 is embodied as machine or computer-readable media. However, as mentioned above, this illustration is not meant to be limiting as the present disclosure contemplates other embodiments such as the aforementioned embodiment where the control system 88, or at least one circuit of the control system 88, is configured as a hardware unit. All such combinations and variations are intended to fall within the scope of the present disclosure.

The processor 80 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the circuits of the control system 88 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 84 (e.g., RAM, ROM, Flash Memory, hard disk storage, etc.) may store data and/or computer code for facilitating the various processes described herein. The memory 84 may be communicably connected to the processor 80 to provide computer code or instructions to the processor 80 for executing at least some of the processes described herein. Moreover, the memory 84 may be or include tangible, non-transient volatile memory or non-volatile memory. Accordingly, the memory 84 may include database components, object code components, script components, or any other type of information structure for supporting the various activities and information structures described herein.

The communication interface 92 is structured to provide and enable communications between and among the processing circuit 76, the control system 88, the engine out temperature sensor 60, the engine out NOx sensor 64, the NH3 slip sensor 68, and the aftertreatment system out temperature sensor 72, and the ECU 52. In some embodiments, the communication interface 92 also communicates directly with the air handling system actuator 24, and the fuel system actuator 28.

The sensor circuit 96 is structured to communicate with the engine out temperature sensor 60, the engine out NOx sensor 64, the NH3 slip sensor 68, and the aftertreatment system out temperature sensor 72 (and any other sensors included in the system) via the communication interface 92. The sensor circuit 96 is structured to receive the engine out temperature signal from the engine out temperature sensor 60 and determine the temperature or an approximate temperature of the exhaust gas leaving the engine system 20. The sensor circuit 96 is structured to receive the engine out NOx signal from the engine out NOx sensor 64 and determine the NOx level or an approximate NOx level, amount, percentage, etc. of the exhaust gas leaving the engine system 20. The sensor circuit 96 is structured to receive the ammonia slip signal from the NH3 slip sensor 68 and determine the NH3 level of the exhaust gas leaving the aftertreatment system 32. The sensor circuit 96 is structured to receive the aftertreatment system out temperature signal from the aftertreatment system out temperature sensor 72 and determine the temperature of the exhaust gas leaving the aftertreatment system 32. In some embodiments, the sensor circuit 96 communicates with other sensors to determine other characteristics. It should be understood that determined, measured, or otherwise acquired values are each examples of sensor data that can be used by the aftertreatment system controller 56. Other sensor data may also be used. For example, other temperatures, NOx levels, NH3 levels, or other values may be sensed and determined and subsequently used to control the engine system 20 or the aftertreatment system 32.

The gas characteristic circuit 100 is structured to receive the sensor data from the sensor circuit 96 and determine a gas characteristic. In some embodiments, the gas characteristic includes a NOx level measured or determined by the NOx sensor 64, or another sensor. In some embodiments, the gas characteristic is a NOx level present in a part of the aftertreatment system 32 other than at the point measured by the engine out NOx sensor 64 (e.g., upstream of the exhaust system 44 if the NOx sensor 64 is positioned immediately downstream of the engine system 20, etc.). The gas characteristic circuit 100 may use the sensor data to determine an aftertreatment system NOx out level, an oxygen level of exhaust gas entering the aftertreatment system 32, a NOx reduction (deNOx) rate, and a variety of other gas characteristics that may be used to aid in the control of the aftertreatment system 32 and engine system 20.

The system characteristic circuit 104 is structured to receive the gas characteristic from the gas characteristic circuit 100 to determine a system characteristic. The system characteristic may include, but is not limited to, a deNox efficiency, a future or predicted deNOx efficiency, a system out NOx value, an exhaust gas flow rate, an exhaust gas temperature, an NH3 storage value, a urea dosing rate, a NH3 slip rate, a future or predicted NH3 slip rate, a NH3 slip value, and/or a future or predicted NH3 slip value. In some embodiments, other system characteristics may also be determined. For example, a catalyst oxygen storage capacity may be determined.

The comparison circuit 108 is structured to communicate with the system characteristic circuit 104 and the memory 84 to compare the system characteristic to a predetermined threshold stored in the memory 84. The predetermined threshold may be a value, a range of values, etc. indicative of an acceptable operating characteristic for the system (or vice versa, an unacceptable operating characteristic for the system). The comparison circuit 108 is structured to determine an offset or a differential between the system characteristic and the predetermined threshold.

The acceptable value circuit 112 is structured to receive the offset from the comparison circuit 108 and determine an acceptable input value. The acceptable input value defines a desired condition of exhaust gas exiting the engine system 20 and entering the aftertreatment system 32. In some embodiments, the acceptable input value includes a range of values that are acceptable to the aftertreatment system controller 56. For example, the acceptable input value may include an engine out temperature or a range of engine out temperatures, or an engine out NOx value or a range of engine out NOx values, an engine out particulate matter amount, etc.

The engine control circuit 116 is structured to receive the acceptable input range from the acceptable value circuit 112 and communicate with the ECU 52 via the communication interface 92. The engine control circuit 116 and the ECU 52 are structured to control operation of the air handling system actuator 24, engine 26, and/or the fuel system actuator 28 in order to realize/achieve or substantially achieve the acceptable input value.

In this regard, the air handling system actuator 24 is controlled to affect the engine system 20 operation and combustion characteristics such that the acceptable input value is realized. For example, a turbocharger valve or operation may be altered, an EGR valve may be opened or closed, the throttle position or values may be altered, and/or the engine brake may be engaged or disengaged.

In another embodiment, the fuel system actuator 28 is controlled to affect the engine system 20 operation and combustion characteristics such that the acceptable input value is realized. For example, a quantity of fuel provided to the combustion chamber may be altered, the timing of fuel injection or the pressure of fuel injection may be altered, and/or ignition timing may be altered.

In another embodiment, the engine 26 is controlled or managed to affect the combustion characteristics such that the acceptable input value is realized or achieved. Control of the engine 26 may be within the confines of operation of the engine 26 to, e.g., meet a vehicle speed requirement, a torque requirement, etc. Thus, while the engine 26 may be manipulated to achieve the acceptable input value, a boundary condition or regulation may be implanted that confines the acceptable use of the engine 26. That said, control of the engine 26 can include controlling an engine speed.

In yet another embodiment, a combination of the fuel system actuator 28, engine 26, and the air handling system actuator 24 is controlled or managed to achieve or substantially achieve the acceptable input value.

Utilizing the aftertreatment system controller 56, the engine system 20 can be operated to improve fuel economy. In other words, the aftertreatment system 32 can be operated near to a maximum capacity or maximum emissions reduction enabling the engine system 20 to run more efficiently.

Figure 3:
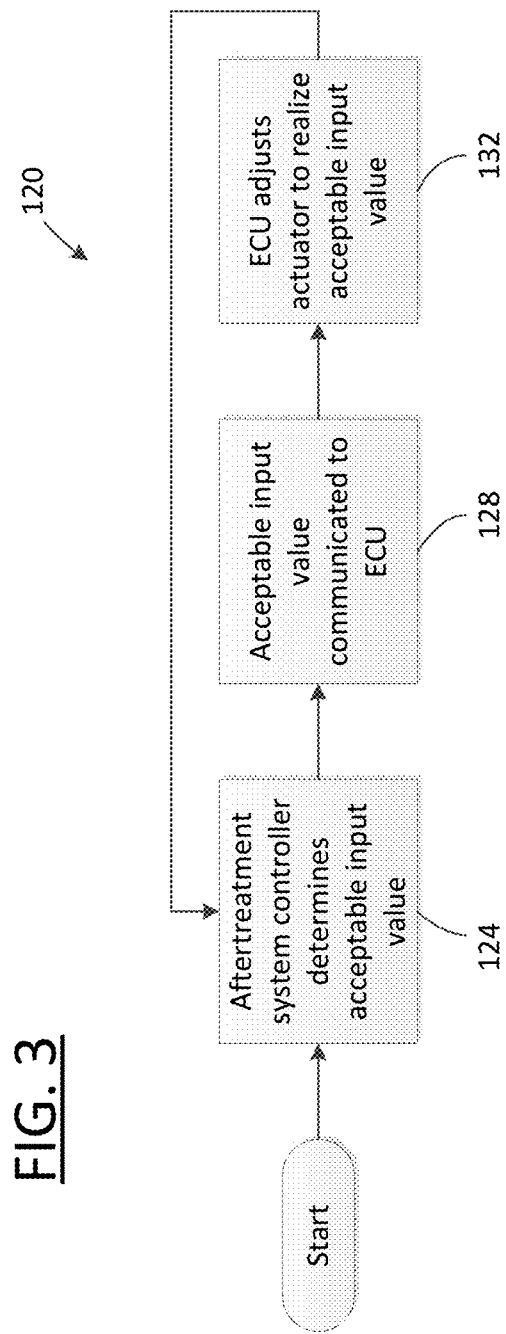
FIG. 3 is a flow chart illustrating a method of controlling the engine of FIG. 1 using the aftertreatment system controller of FIG. 2, according to an example embodiment.

As shown in FIG. 3, a method 120 of operating the engine system 20 includes determining an acceptable input value with the control system 88 based on sensor data at process 124. The acceptable input value may include a range of values that the aftertreatment system controller 56 determines are acceptable to produce a desired outcome or system characteristic. For example, the aftertreatment system controller 56 may determine that a deNOx efficiency is greater than a threshold value, and provide an acceptable input value or range that allows the engine system 20 to operate at a higher fuel efficiency and produce a larger engine out NOx value. In one example, the deNOx efficiency threshold value is about or approximately ninety percent (90%) (e.g., plus-or-minus two percent). In some other embodiments, the deNOx efficiency threshold value is between about or approximately ninety percent (90%) and about ninety nine percent (99%).

At process 128, the acceptable input value is communicated via the communications interface 92 to the ECU 52. The ECU 52 may operate the engine system 20 in view of the acceptable input value. At process 132, the ECU 52 adjusts operation of the air handling system actuator 24 and/or the fuel system actuator 28 in order to realize the acceptable input value. Once the operation of the engine system 20 is adjusted, the aftertreatment system controller 56 continues to monitor the sensor data and provide feedback to the ECU 52 in order to control the engine system 20 to operate within the acceptable input value or range. The method 120 provides engine control based at least in part on exhaust gas characteristics and is directed by the aftertreatment system controller 56. In a typical system, the ECU operates the engine independently, and the aftertreatment system must be sized and adapted to accommodate whatever the engine produces. The method 120 allows the engine system 20 to be operated with an improved fuel economy because the aftertreatment system 32 is being used more effectively. Additionally, the method 120 allows the size and/or overall capacity of the aftertreatment system 32 to be reduced because the engine system 20 is controlled to operate within the available capacity of the aftertreatment system 32, and not the other way around.

Figure 4:
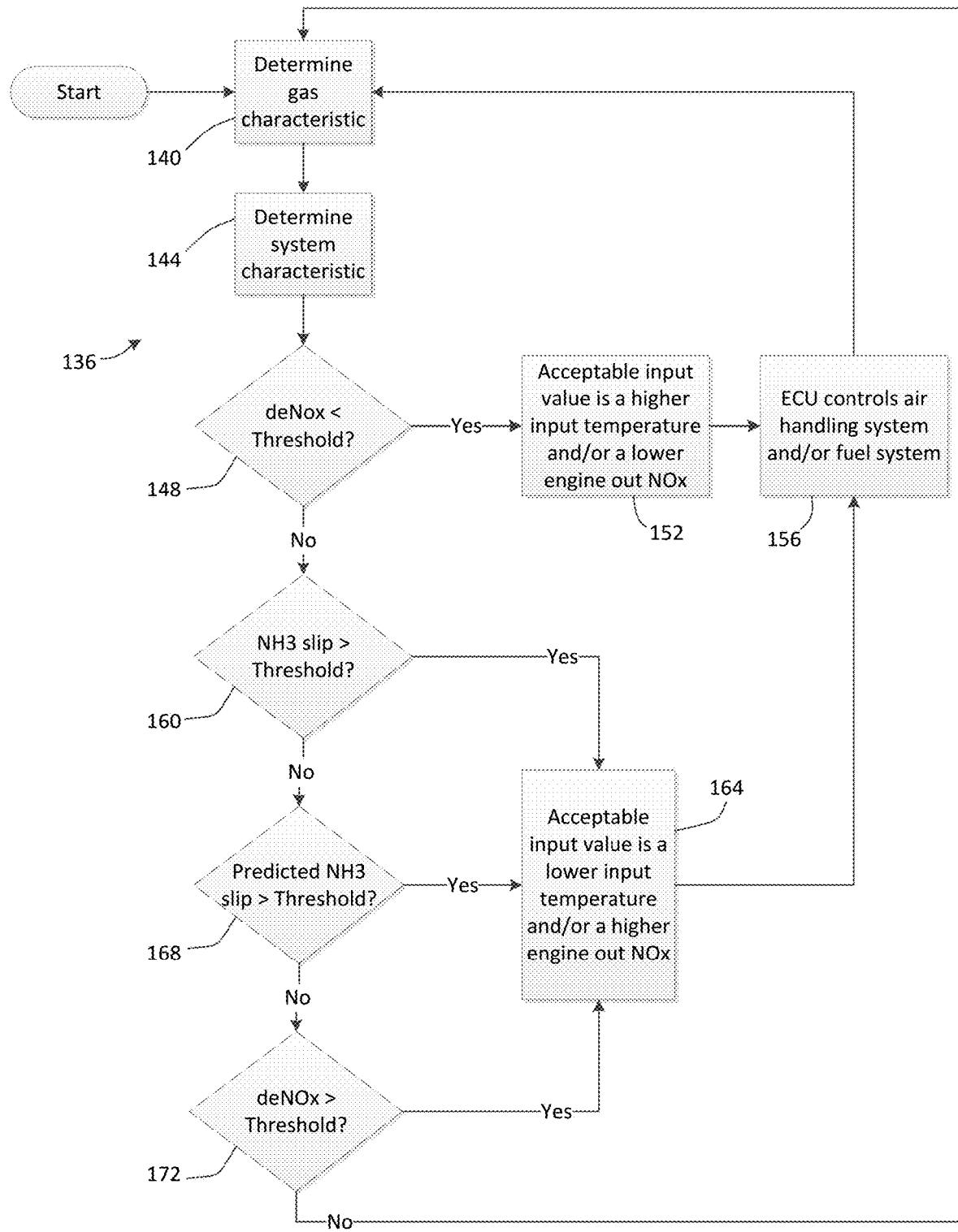
FIG. 4 is a flow chart illustrating a method of controlling the engine of FIG. 1 using the aftertreatment system controller of FIG. 2, according to an example embodiment.

As shown in FIG. 4, a method 136 of operating the engine system 20 includes determining one or more exhaust gas characteristics with the gas characteristic circuit 100 at process 140. The exhaust gas characteristic may include a NOx level, a NH3 slip amount or value, a temperature, or another characteristic.

At process 144, the system characteristic circuit 104 determines one or more system characteristics based on the exhaust gas characteristics determined in process 140. In some embodiments, the system characteristics include a deNOx efficiency, a NH3 slip, a predicted NH3 slip, and/or a ratio of NO and NO2. In some embodiments, the system characteristics include temperatures at specific positions in the aftertreatment system 32, exhaust gas flow rates, actual or calculated NOx values, actual or calculated NH3 values, actual or calculated oxygen values, and/or other characteristics.

At process 148, the deNOx efficiency is compared to a predetermined deNOx threshold by the comparison circuit 108. In general, the deNOx efficiency increases as engine out temperature increases. In some embodiments, the deNOx threshold is about ninety-five percent (95%). In some embodiments, the deNOX threshold is a range between about ninety percent and about ninety-five percent (90-95%).

If the deNOx efficiency is less than (or at or less than) the deNOx threshold, then the method 136 progresses to process 152 and the acceptable value circuit 112 determines an acceptable input value in response to the comparison at process 148. The acceptable input value is then communicated to the ECU 52 by the engine control circuit 116. At process 152, the acceptable input value is an increased engine out temperature and/or a lower engine out NOx value.

At process 156, the ECU 52 receives the acceptable input value and controls the air handling system actuator 24 and/or the fuel system actuator 28 in order to achieve or realize the acceptable input value. As discussed above, the ECU 52 may affect fuel quantity, pressure, timing, etc. and/or air flow via a turbocharger, an EGR valve, a throttle, an exhaust throttle, or an engine break. In some embodiments, other actuators or systems may be used to affect the combustion characteristics of the engine system 20 such that the acceptable input value and/or range is achieved.

If the aftertreatment system controller 56 determines at process 148 that the deNOx efficiency is not less than the deNOx threshold, then the method proceeds to process 160 and the NH3 slip is compared to a predetermined NH3 slip threshold by the comparison circuit 108. If the NH3 slip is greater than the NH3 slip threshold, the acceptable value circuit 112 determines an acceptable input value and the engine control circuit 116 communicates with the ECU 52 at step 164. The acceptable input value determined at step 164 is a decreased engine out temperature and/or a higher engine out NOx value. In some embodiments, the NH3 slip threshold is about or approximately twenty five (25) parts per million (ppm). In some other embodiments, the NH3 slip threshold is between about or approximately ten (10) ppm and about fifty (50) ppm. It should be understood that the terms "about" or "approximately" are intended to have their ordinary meaning in the art when quantifying PPM of NH3 slip.

The acceptable input value determined at process 164 is received by the ECU 52 at process 156, and the ECU 52 controls the air handling system actuator 24, engine 26, and/or the fuel system actuator 28 in order to achieve or realize the acceptable input value.

If the aftertreatment system controller 56 determines at process 160 that the NH3 slip is not greater than the NH3 slip threshold, then the method proceeds to process 168 and the predicted NH3 slip is compared to the predetermined NH3 slip threshold by the comparison circuit 108. In some embodiments, the predicted NH3 slip is determined by the system characteristic circuit 104 using urea dosing data, temperature data, and NOx data. If the predicted NH3 slip is greater than the NH3 slip threshold, the acceptable value circuit 112 determines an acceptable input value at step 164 including a decreased engine out temperature and/or a higher engine out NOx value, and ECU 52 receives the acceptable input value at step 156. The ECU 52 then controls the air handling system actuator 24, engine 26, and/or the fuel system actuator 28 at step 156 to achieve the acceptable input value.

If the aftertreatment system controller 56 determines at process 168 that the predicted NH3 slip is not greater than the NH3 slip threshold, then the method proceeds to process 172 and the deNOx efficiency is compared to the deNOx efficiency threshold by the comparison circuit 108. If the deNOx efficiency is greater than the deNOx efficiency threshold, the acceptable value circuit 112 determines an acceptable input value at step 164 including a decreased engine out temperature and/or a higher engine out NOx value, and ECU 52 receives the acceptable input value at step 156. The ECU 52 then controls the air handling system actuator 24 and/or the fuel system actuator 28 at step 156 to achieve the acceptable input value. If the deNOx efficiency is not greater than the deNOx efficiency threshold, the method returns to process 140 and continues to monitor the aftertreatment system 32 via the sensor data.

Figure 5:
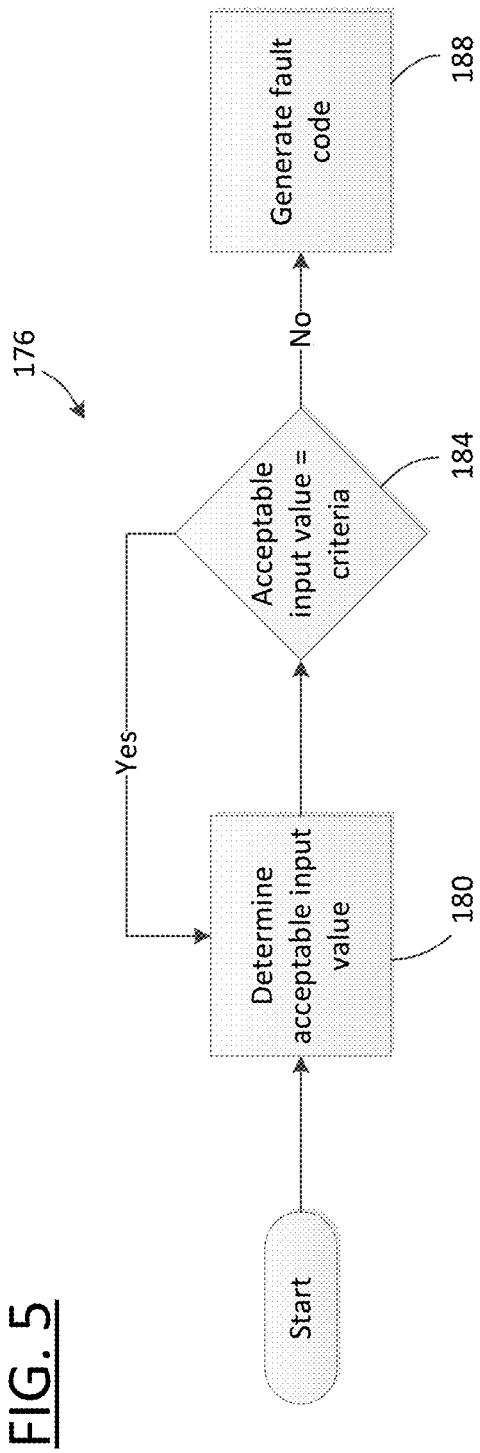
FIG. 5 is a flow chart illustrating a method of generating faults using the aftertreatment system controller of FIG. 2, according to an example embodiment.

As shown in FIG. 5, the aftertreatment system controller 56 also provides an improved fault detection system. In typical aftertreatment systems, situations can arise where a false fault is generated because conditions occur that were not tested for during production. The aftertreatment system controller 56 is able to utilize the determined acceptable input values to monitor the engine system 20 and aftertreatment system 32. By determining faults based on the acceptable input value, the aftertreatment system controller 56 can account for variability in system components and operating conditions. A method 176 of determining faults includes monitoring the acceptable input values generated by the acceptable value circuit 112 at process 180. In some embodiments, the acceptable input values are generated using the method 136 at processes 152 and/or 164.

At process 184, the acceptable input value is compared to a predetermined threshold criterion. In some embodiments, the threshold criterion is an engine out temperature range. If the engine out temperature determined by the gas characteristic circuit 100 does not fall within, or does not meet the threshold criterion, then a fault code is generated at process 188. In some embodiments, the threshold criterion is a NH3 slip and if the NH3 slip determined by the gas characteristic circuit 100 does not fall within, or does not meet the threshold criterion, then a fault code is generated at process 188. Other characteristics and acceptable input values are contemplated and may be used both for control of the engine system 20 and for fault detection.

As discussed above, the aftertreatment system controller 56 and the overall system described herein can provide for the reduction in size or even, in some instances, the elimination of particular aftertreatment system components. For example, a system as described above may be capable of significantly reducing the size of an ammonia oxidation (AMOX) catalyst. Current systems must include AMOX catalysts that are larger than required in order to account for aging and the resultant reduction is effectiveness. The aftertreatment system controller 56 is structured to control the engine system 20 such that ammonia in the AMOX catalyst is always or mostly always used/burned and NH3 slip is minimized. For example, if the AMOX catalyst has degraded over time, the engine system 20 is controlled to function within the limits or operating parameters of the current condition of the AMOX catalyst.

Similarly, the AMOX catalyst may be entirely eliminated if the engine system 20 is controlled by the aftertreatment system controller 56. By monitoring the NH3 slip and predicted NH3 slip, the aftertreatment system controller 56 can adjust the engine system 20 operating parameters to produce more NOx and burn the slipping NH3. The reduction in the size and complexity of the AMOX catalyst can improve reliability, production costs, and maintenance costs of the aftertreatment system.

It should be understood that no claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1 and 2, it should be understood that the ECU 52 and/or the aftertreatment system controller 56 may include any number of circuits for completing the functions described herein. For example, the activities and functionalities of the sensor circuit 96, the gas characteristic circuit 100, the system characteristic circuit 104, the comparison circuit 108, the acceptable value circuit 112, and/or the engine control circuit 116 may be combined in multiple circuits or as a single circuit. Additional circuits with additional functionality may also be included. Further, it should be understood that the ECU 52 and/or the aftertreatment system controller 56 may further control other activity beyond the scope of the present disclosure.

As mentioned above and in one configuration, the "circuits" may be implemented in machine-readable medium for execution by various types of processors, such as processor 80 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data, values, inputs, may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor).

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
    an engine out sensor positioned between an engine system and an aftertreatment system within a flow of exhaust gas, the sensor structured to provide an engine out information;
    an exhaust sensor structured to provide an exhaust information indicative of an aftertreatment system characteristic; and
    one or more processing circuits comprising one or more memory devices coupled to one or more processors, the one or more memory devices configured to store instructions thereon that, when executed by the one or more processors, cause the one or more processors to:
        receive the engine out sensor information from the engine out sensor;
        receive the exhaust information from the exhaust sensor;
        determine a NOx reduction (deNOx) efficiency based on the exhaust information;
        determine a predicted ammonia slip level based on the exhaust information, the predicted ammonia slip level indicative of a quantity of ammonia leaving the aftertreatment system;
    compare the deNOx efficiency to a deNOx threshold;
    in response to the comparison indicating that the deNOx efficiency is less than the deNOx threshold:
    receive a first deNOx acceptable input value indicative of at least one of an engine out temperature or an engine out NOx value; and
    at least one of increase the engine out temperature or reduce the engine out NOx value to adjust the deNOx efficiency towards the deNOx threshold;
    compare the predicted ammonia slip level to an ammonia slip threshold, the ammonia slip threshold indicative of a predefined acceptable value of ammonia leaving the aftertreatment system;
    in response to the comparison indicating that the predicted ammonia slip level is greater than the ammonia slip threshold, reduce the engine out temperature;
    in response to the comparison indicating that the predicted ammonia slip level is less than the ammonia slip threshold, compare the deNOx efficiency to the deNOx threshold; and
    in response to the comparison indicating that the deNOx efficiency is greater than the deNOx threshold and the comparison indicating that the predicted ammonia slip level is less than the ammonia slip threshold:
        receive a second deNOx acceptable input value differing from the first deNOx acceptable input value, the second deNOx acceptable input value indicative of at least one of the engine out temperature or the engine out NOx value;
        reduce the engine out temperature to operate at the second deNOx acceptable input value such that the deNOx efficiency adjusts towards the deNOx threshold; and
    wherein the first deNOx acceptable input value and the second deNOx acceptable input value are each at least one of a desired exhaust gas temperature or a desired NOx quantity of exhaust gas leaving the engine.

2. The system of claim 1, wherein the one or more processing circuits are in feedback communication with the engine system and continuously operate the engine system.

3. The system of claim 1, wherein the exhaust information includes at least one of a system out NOx value, an exhaust flow rate value, an exhaust gas temperature, a reductant dosing value, or an ammonia storage factor.

4. A system comprising:
    a controller including a processing circuit, the controller structured to:
        determine a NOx reduction (deNOx) efficiency based on an exhaust information from an exhaust sensor;
        compare the deNOx efficiency to a deNOx threshold;
        in response to the comparison indicating that the deNOx efficiency is less than the deNOx threshold:
            receive a first deNOx input value indicative of at least one of an engine out temperature or an engine out NOx value; and
            at least one of increase the engine out temperature or reduce the engine out NOx value to adjust the deNOx efficiency towards the deNOx threshold;
        determine a predicted ammonia slip level based on the exhaust information, the predicted ammonia slip level indicative of a quantity of ammonia leaving the aftertreatment system;
        compare the predicted ammonia slip level to an ammonia slip threshold, the ammonia slip threshold indicative of a predefined acceptable value of ammonia leaving the aftertreatment system;
        in response to the comparison indicating that the predicted ammonia slip level is greater than the ammonia slip threshold, reduce the engine out temperature;
        in response to the comparison indicating that the predicted ammonia slip level is less than the ammonia slip threshold and the deNOx efficiency is greater than the deNOx threshold, reduce the engine out temperature to operate at a second deNOx acceptable input value, differing from the first deNOx acceptable input value, such that based on the deNOx input value to adjust the deNOx efficiency adjusts towards the deNOx threshold; and
    wherein the first deNOx acceptable input value and the second deNOx acceptable input value are each at least one of a desired exhaust gas temperature or a desired NOx quantity of exhaust gas leaving the engine.

5. The system of claim 4, wherein the controller is in feedback communication with an engine system and continuously operates the engine system.

6. The system of claim 4, wherein the exhaust information includes at least one of a system out NOx value, an exhaust flow rate, an exhaust gas temperature, a reductant dosing value, or an ammonia storage factor.

7. A method comprising:
receiving an engine out signal by a controller, the engine out signal indicative of engine out information;
receiving an exhaust gas signal by the controller, the exhaust gas signal indicative of an exhaust information from an exhaust sensor;
determining a NOx reduction (deNOx) efficiency by the controller, the deNOx efficiency based on the exhaust information;
comparing the deNOx efficiency to a deNOx threshold by the controller;
in response to the comparison indicating that the deNOx efficiency is less than the deNOx threshold:
receiving, by the controller, a first deNOx acceptable input value indicative of at least one of an engine out temperature or an engine out NOx value;
at least one of increasing the engine out temperature by the controller or reducing the engine out NOx value by the controller to adjust the deNOx efficiency towards the deNOx threshold;
determining a predicted ammonia slip level by the controller, the predicted ammonia slip level based on the exhaust information and indicative of a quantity of ammonia leaving the aftertreatment system;
comparing the predicted ammonia slip level to an ammonia slip threshold by the controller, the ammonia slip threshold indicative of a predefined acceptable value of ammonia leaving the aftertreatment system;
in response to the comparison indicating that the predicted ammonia slip level is greater than the ammonia slip threshold, reducing the engine out temperature by the controller;
in response to the comparison indicating that the predicted ammonia slip level is less than the ammonia slip threshold and the deNOx efficiency is greater than the deNOx threshold, reducing the engine out temperature, by the controller, to operate at a second deNOx acceptable input value such that based on the deNOx input value to adjust the deNOx efficiency adjusts towards the deNOx threshold;
controlling, by the controller, at least one actuator to achieve the increased engine out temperature, the reduced engine out NOx value, or the decreased engine out temperature; and
wherein the first deNOx acceptable input value and the second deNOx acceptable input value are each at least one of a desired exhaust gas temperature or a desired NOx quantity of exhaust gas leaving the engine.

8. The method of claim 7, wherein the exhaust information includes at least one of a system out NOx, an exhaust flow rate, an exhaust gas temperature, a reductant dosing value, or an ammonia storage factor.

* * * * *